United States Patent
Cha et al.

(10) Patent No.: US 9,533,624 B2
(45) Date of Patent: Jan. 3, 2017

(54) CARRIER APPARATUS FOR VEHICLE

(71) Applicant: Hyundai Motor Company, Seoul (KR)

(72) Inventors: Dong Eun Cha, Suwon-Si (KR); Hyun Gyung Kim, Hwaseong-Si (KR); Phil Jung Jeong, Yongin-Si (KR); Bock Cheol Lee, Suwon-Si (KR); Young Sub Oh, Suwon-Si (KR); Seung Mok Lee, Osan-Si (KR); Soo Hyun Hyun, Gyeongju-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 101 days.

(21) Appl. No.: 14/552,424

(22) Filed: Nov. 24, 2014

(65) Prior Publication Data

US 2016/0052459 A1 Feb. 25, 2016

(30) Foreign Application Priority Data

Aug. 19, 2014 (KR) ........................ 10-2014-0107780

(51) Int. Cl.
| | |
|---|---|
| *B60R 19/02* | (2006.01) |
| *B60R 7/00* | (2006.01) |
| *B60R 11/00* | (2006.01) |
| *B60R 9/06* | (2006.01) |
| *B60R 9/10* | (2006.01) |

(52) U.S. Cl.
CPC . *B60R 9/06* (2013.01); *B60R 9/10* (2013.01); *B60R 19/023* (2013.01)

(58) Field of Classification Search
CPC .............. B60R 9/06; B60R 19/02; B60R 7/00; B60R 9/10; B60R 11/00
See application file for complete search history.

(56) References Cited

U.S. PATENT DOCUMENTS

| | | | | |
|---|---|---|---|---|
| 4,646,952 | A | * | 3/1987 | Timmers .................. B60R 9/06 224/485 |
| 4,915,276 | A | * | 4/1990 | Devito ...................... B60R 9/06 224/500 |

(Continued)

FOREIGN PATENT DOCUMENTS

| | | |
|---|---|---|
| EP | 2570305 A2 | 3/2013 |
| KR | 10-2011-0034733 A | 4/2011 |
| KR | 10-2011-0050162 A | 5/2011 |

*Primary Examiner* — Brian D Nash
(74) *Attorney, Agent, or Firm* — Morgan, Lewis & Bockius LLP

(57) ABSTRACT

A carrier apparatus for a vehicle may include guide rails symmetrically disposed under a rear bumper beam and extending in a front-rear direction, a carrier having a panel and sliding rails and stowed or drawn out under the rear bumper beam by sliding in the front-rear direction along the guide rails, tilting mechanisms that include fixing brackets disposed at rear ends of the guide rails and tilting brackets disposed behind the fixing brackets at the rear ends of the guide rails and capable of turning on the rear bumper beam, and tilting actuators disposed on the fixing brackets of the tilting mechanisms to be selectively connected to the tilting brackets, connected to the tilting brackets to restrict turning of the tilting brackets when not in use, and disconnected from the tilting brackets to allow the carrier to turn with the tilting brackets when the carrier is fully drawn out.

14 Claims, 8 Drawing Sheets

(56) References Cited

U.S. PATENT DOCUMENTS

| | | | | |
|---|---|---|---|---|
| 5,445,300 | A * | 8/1995 | Eipper | B60R 9/06 224/496 |
| 5,460,304 | A * | 10/1995 | Porter | B60R 9/06 224/485 |
| 5,685,686 | A * | 11/1997 | Burns | B60R 9/06 224/282 |
| 5,775,560 | A * | 7/1998 | Zahn | B60R 9/06 224/485 |
| 7,909,213 | B2 * | 3/2011 | Bergerhoff | B60R 9/10 224/197 |
| 8,418,902 | B2 * | 4/2013 | Cha | B60R 9/10 224/488 |
| 9,174,584 | B1 * | 11/2015 | Cha | B60R 9/10 |
| 2007/0090142 | A1 * | 4/2007 | Chuang | B60P 3/07 224/496 |
| 2008/0142559 | A1 | 6/2008 | Lim et al. | |
| 2010/0001029 | A1 * | 1/2010 | Tai | B60R 9/06 224/499 |
| 2011/0108592 | A1 * | 5/2011 | Lee | B60R 9/06 224/488 |
| 2012/0024923 | A1 * | 2/2012 | Cha | B60R 9/06 224/533 |
| 2013/0175308 | A1 | 7/2013 | Sautter et al. | |

* cited by examiner

CARRIER APPARATUS FOR VEHICLE

CROSS-REFERENCE TO RELATED APPLICATION

The present application claims priority of Korean Patent Application Number 10-2014-0107780 filed Aug. 19, 2014, the entire contents of which are incorporated herein for all purposes by this reference.

BACKGROUND

Technical Field

The present invention relates to a carrier disposed on the rear bumper of a vehicle to load a bicycle and packages, and more particularly, to a carrier apparatus for a vehicle which is stowed in a rear bumper beam when not in use, but is drawn out and capable of tilting in that position to load a bicycle on a vehicle.

Description of the Related Art

Recently, as people use bicycles for leisure activities, they load bicycles on vehicles to carry them around bicycle-only roads or mountains.

However, bicycles are generally large in volume, so it is difficult to load them in vehicles, even using the trunk or the backseat space of vehicles.

Although various methods of loading a bicycle on the outer surfaces of vehicles have been proposed to solve the problem, the manner of loading and fixing a bicycle on the roof panel of a vehicle not only makes loading itself very inconvenient, but increases the height of the vehicle, such that it may cause a safety accident due to the bicycle caught to when the vehicle enters a tunnel or a building.

In the case of a bicycle mounted on the tailgate of a vehicle, complex installation is required for a specific carrier device; and the carrier device remains visible even when there is no bicycle mounted thereon, thereby detracting from the external appearance of a vehicle.

Further, there is trouble that it is required to install the carrier device to load a bicycle and to separate the carrier device when a bicycle is not loaded, thus decreasing convenience.

The information disclosed in this Background section is only for enhancement of understanding of the general background of the invention and should not be taken as an acknowledgement or any form of suggestion that this information forms the prior art already known to a person skilled in the art.

SUMMARY

The present invention has been made in an effort to provide a carrier apparatus for a vehicle which is disposed inside a rear bumper beam of a vehicle, is not exposed to the outside when not in use, and can keep the external appearance of the vehicle and improve convenience by automatically drawing out of a rear bumper beam so that a bicycle can be loaded when the bicycle loading is desired.

In various aspects, the present invention provides a carrier apparatus for a vehicle, which includes: guide rails that are substantially symmetrically disposed under a rear bumper beam and extend in a front-rear direction; a carrier that has a panel and sliding rails extending from both sides of the panel to the corresponding guide rails and is stowed or drawn out under the rear bumper beam by sliding in the front-rear direction along the guide rails; tilting mechanisms that include fixing brackets disposed at the rear ends of the guide rails and tilting brackets disposed behind the fixing brackets at rear ends of the guide rails and capable of turning on the rear bumper beam; and tilting actuators that are disposed on the fixing brackets of the tilting mechanisms to be selectively connected to the tilting brackets, are connected to the tilting brackets to restrict turning of the tilting brackets when not in use, and are disconnected from the tilting brackets to allow the carrier to turn with the tilting brackets when the carrier is fully drawn out.

The fixing brackets of the tilting mechanisms may be fixed to the rear ends of the guide rails, and each tilting bracket may include a fixing member that is fixed to the rear bumper beam and extends downward and a tilting member that is disposed adjacent and behind a corresponding fixing bracket and capable of turning on the fixing member.

A tilting stopping groove may be formed at an end, adjacent the corresponding fixing bracket, of the tilting member of the tilting bracket and a tilting actuator that is selectively inserted into the tilting stopping groove of the tilting member may be disposed on the corresponding fixing bracket.

The tilting actuators may include first solenoids.

The tilting members of the tilting brackets may have sliders and the sliders may allow or prevent sliding of the carrier by being selectively coupled to the sliding rails of the carrier. The sliders may include second solenoids and slider stopping grooves to which the second solenoids are selectively coupled may be formed on sides of the sliding rails.

A motor assembly may be disposed on the carrier and have driving links extending laterally toward the sliding rails, and when the motor assembly is operated, power may be transmitted through the driving links so that the carrier slides along the guide rails.

Pinion gears may be disposed on extending ends of the driving links and rack gears extending in the front-rear direction and engaged with the pinion gears may be disposed on the guide rails so that as the driving links are rotated by the motor assembly, the pinion gears move on the rack gears.

The motor assembly have an expansion link extending rearward from the motor assembly to be substantially perpendicular to the driving links, and connected to the panel and an expansion member opening to both sides from the extension link when the motor assembly is operated may be disposed on the expansion link.

The expansion member may include a pair of pivot bars substantially symmetrically disposed with the expansion link therebetween, the pair of the pivot bars having first ends connected to the expansion link and second ends laterally extending, and a bicycle mount supported on the sliding rails of the carrier may be disposed at the second ends of the pivot bars.

The bicycle mount may include movable members hinged to the second ends of the pivot bars and supporting members disposed on the movable members, extending laterally, and supporting the wheels of a bicycle.

The carrier may include a horizontal expansion rail extending across the sliding rails and the movable members of the bicycle mount may be disposed on the horizontal expansion rail, so the movable members may move laterally along the horizontal expansion rail when the motor assembly is operated.

The expansion link may include a lead screw and the first ends of the pair of the pivot bars of the expansion member may be connected to the expansion link through a lead nut.

A fixing bar that is able to turn and a lock for fixing a position of the fixing bar that has been turned may be mounted on the sliding rails of the carrier.

According to the carrier apparatus for a vehicle of the present invention, the bicycle carrier is installed inside the rear bumper beam of a vehicle, so it is not exposed to the outside in normal times, but automatically slides out from the bumper back beam to load a vehicle, and therefore, the external appearance is maintained and convenience is also improved.

Further, since the carrier can tilt after being drawn out, the rear loading space can be more easily used, and since the bicycle mount for loading a bicycle laterally expands, the commercial value is improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

Figure 1:
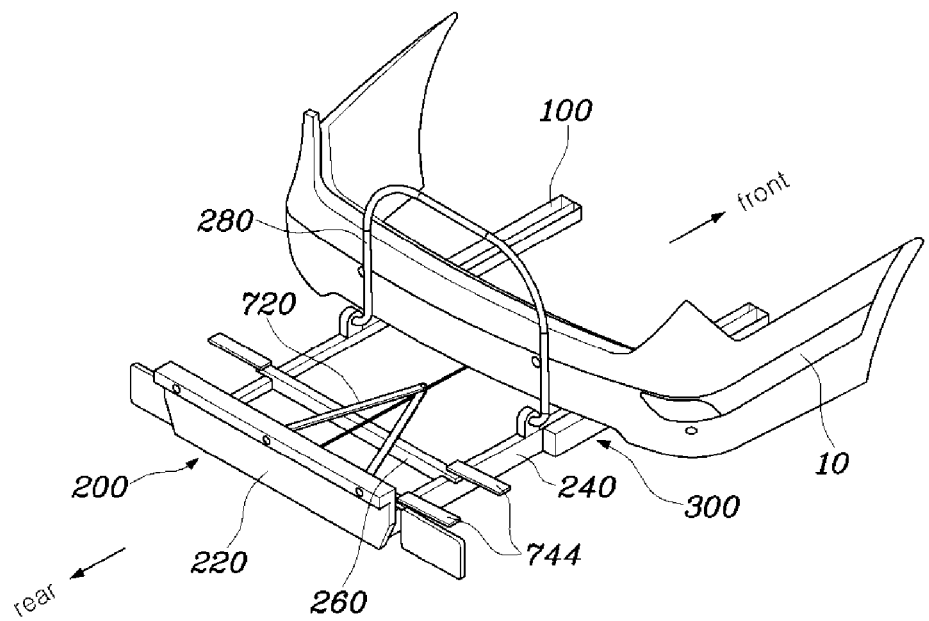
FIG. 1 is a perspective view of an exemplary carrier apparatus for a vehicle according to the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a carrier apparatus for a vehicle according to various embodiments of the present invention is described with reference to the accompanying drawings.

Figure 2:
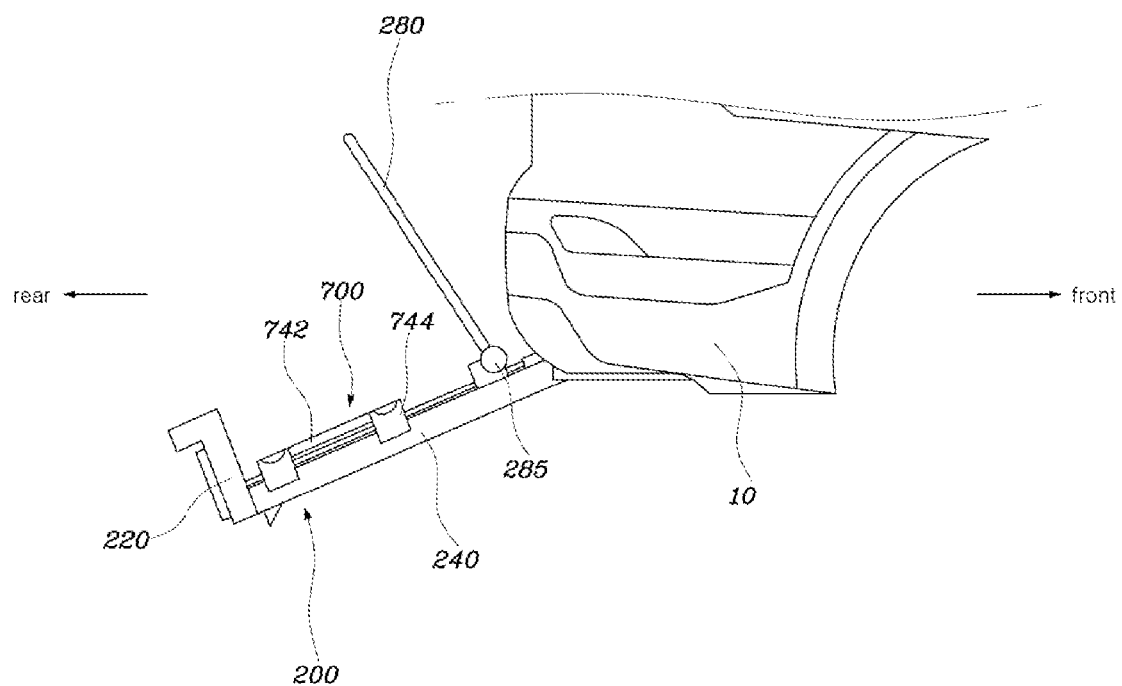
FIG. 2 is a view showing tiling of the carrier apparatus for a vehicle shown in FIG. 1.

FIG. 1 is a perspective view of a carrier apparatus for a vehicle according to various embodiments of the present invention, FIG. 2 is a view showing tiling of the carrier apparatus for a vehicle shown in FIG. 1, and FIGS. 3 to 10 are views illustrating the carrier apparatus for a vehicle shown in FIG. 1.

A carrier apparatus for a vehicle of the present invention includes: guide rails 100 that are symmetrically or substantially symmetrically disposed at both sides of a rear bumper beam 10 and extend in the front-rear direction; a carrier 200 that has a panel 220 and sliding rails 240 extending from both sides of the panel 220 to the guide rails 100 and is stowed or drawn out under the rear bumper beam 10 by sliding in the front-rear direction along the guide rails 100; tilting mechanisms 300 that are each composed of or include fixing brackets 320 disposed at the rear ends of the guide rails 100 and tilting brackets 340 that are disposed behind the fixing brackets 320 at the rear ends of the guide rails 100 and capable of turning on the rear bumper beam 10; and tilting actuators 400 that are disposed on the fixing brackets 320 of the tilting mechanisms 300 to be selectively connected to the tilting brackets 340, are connected to the tilting brackets 340 to restrict turning of the tilting brackets 340 when not in use, and are disconnected from the tilting brackets 340 to allow the carrier 200 to turn with the tilting brackets 340 when the carrier 200 is fully drawn out.

The carrier apparatus of the present invention may be installed inside the rear bumper beam 10 of a vehicle, and may be stowed in or drawn out from the rear bumper beam 10, or stowed in or drawn out from under the rear bumper beam 10.

Since the carrier apparatus is stowed in and drawn out from the rear bumper beam 10 of a vehicle, exposure to the outside of the apparatus is minimized without detraction of the design from installation of the carrier apparatus and breakdown of the carrier apparatus due to dirt is prevented.

The guide rails 100 are fixed symmetrically or substantially symmetrically at both sides of the rear bumper beam 10, extending in the front-rear direction. That is, the carrier apparatus is stowed in or drawn out from the rear bumper beam 10 by sliding along the guide rails 100.

The carrier 200 has a panel 220 making the same surface with the rear bumper beam 10 and the sliding rails 240 extending rearward from both sides of the panel 220 are connected to the guide rails 100. That is, as the sliding rails 240 of the carrier 200 move along the guide rails, the carrier is stowed in or drawn out.

In the present invention, the carrier 200 is stowed in or drawn out from the rear bumper beam 10 and it can also tilt at a predetermined angle after being drawn out.

To this end, the tilting mechanisms 300 that are each composed of or include the fixing bracket 320 disposed at the rear end of the guide rails 100 and the tilting bracket 340 disposed behind the fixing bracket 320 at the rear end of the guide rail 100 and capable of turning on the rear bumper beam 10 are disposed to allow the carrier 200 to tilt when the tilting bracket 340 turns with the carrier 200 fully drawn out.

In the present invention, the tilting actuators 400 controlling the turning of the tilting mechanisms 300 are disposed on the fixing brackets 320 of the tilting mechanisms 300 to be selectively connected to the tilting brackets 340. The tilting actuators 400 are connected to the tilting bracket 340 and prevent turning when the apparatus is not in use, but when the carrier 200 is fully drawn out, they are separated from the tilting brackets 340 and allow the carrier 200 to turn with the tilting brackets 340.

In detail, as shown in FIGS. 3 to 6, the fixing brackets 320 of the tilting mechanisms 300 are fixed at the rear ends of the guide rails 100 and the tilting brackets 340 may be composed of or include a fixing member 342 that is fixed to the rear bumper beam 10 and extends downward and a tilting member 344 that is disposed closely behind the fixing bracket 320 and capable of turning on the fixing member 342.

The tilting members 344 allow the sliding rails 240 of the carrier 200 to move, so the carrier 200 can move to the tilting members 344 along the guide rails 100. The tilting members 344 are hinged to the fixing members 342 to be able to turn, so when the carrier 200 is fully drawn out to the position of the tilting members 344, the tilting members 344 turn about the hinged points on the fixing members 342 and the carrier 200 tilts accordingly.

Figure 9:
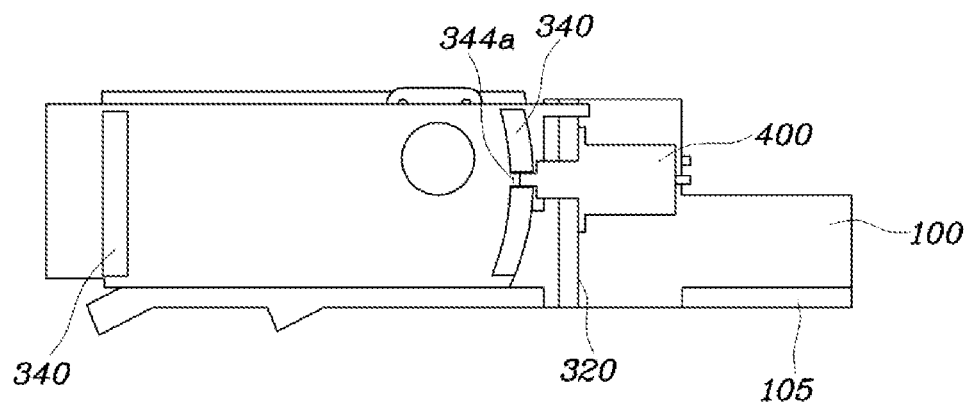
Figure 10:
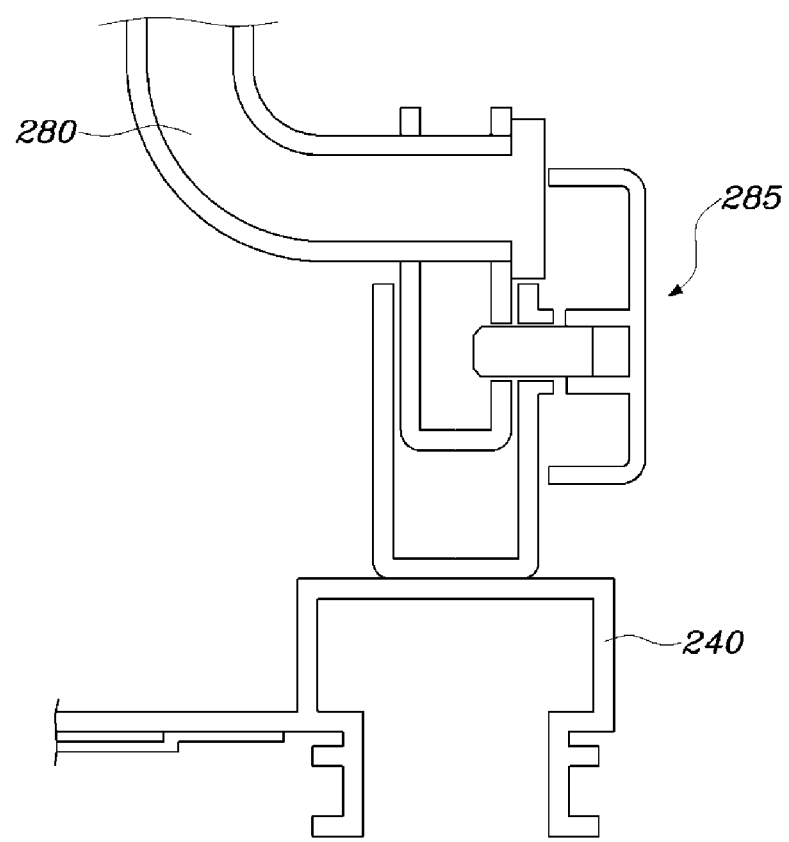

On the other hand, as shown in FIG. 9, a tilting stopping groove 344a may be formed at the end, which is close to the fixing bracket 320 in the tilting member 344 of the tilting bracket 340 and a tilting actuator 400 that is selectively inserted into the tilting stopping groove 344a of the tilting member 344 may be disposed on the fixing bracket 320.

The tilting actuator 400 may be a first solenoid and is disposed on the fixing bracket 320 such that a solenoid pin stretches out rearward, and the tilting stopping groove 344a is formed at the front end of the tilting member 344 such that the solenoid pin of the tilting actuator 400 is inserted therein.

Accordingly, the solenoid pin of the tilting actuator 400 stretches out and is inserted in the tilting stopping groove 344a of the tilting member 344 to prevent the tilting member 344 from turning when the apparatus is not in use, but when the carrier 200 tilts, the solenoid pin is separated from the tilting stopping groove 344a of the tilting member 344 and allows the tilting member 344 to turn.

That is, the tilting brackets 340 of the tilting mechanisms 300 are connected to or disconnected from the fixing brackets 320 fixed on the guide rails 100, depending on whether the tilting actuators 400 operate or not, so tilting of the carrier 200 is controlled.

The tilting members 344 of the tilting brackets 340 have a slider 500 and the slider 500 can allow or prevent sliding of the carrier 200 by being selectively coupled to the sliding rails 240 of the carrier 200.

In detail, the sliders 500 are second solenoids and slider stopping grooves 242 to which the second solenoids are selectively coupled may be formed on sides of the sliding rails 240.

Since the tilting members 344 of the tilting brackets 340 have the sliders 500 that are second solenoids with a solenoid pin protruding inward and the slider stopping grooves 242 into which the solenoid pins of the second solenoids are inserted are formed on the sides of the sliding rails 240 of the carrier 200, sliding of the carrier 200 is controlled in accordance with whether the solenoid pins of the second solenoids are inserted into the slider stopping grooves 242.

This is for controlling forward/rearward sliding of the carrier 200, and so when the solenoid pins of the sliders 500 are inserted in the slider stopping grooves 242 while the carrier 200 is fully stowed in or drawn out, forward/rearward sliding of the carrier 200 is prevented, but when the solenoid pins are separated from the slider stopping grooves 242, the carrier 200 is unlocked and accordingly it can move.

The slider stopping grooves 242 may be formed on the sides of the front and rear portions of the sliding rails 240 of the carrier 200 and they may be positioned to correspond to the sliders 500 of the tilting brackets 340 when the carrier 200 is fully stowed in or drawn out.

Figure 4:
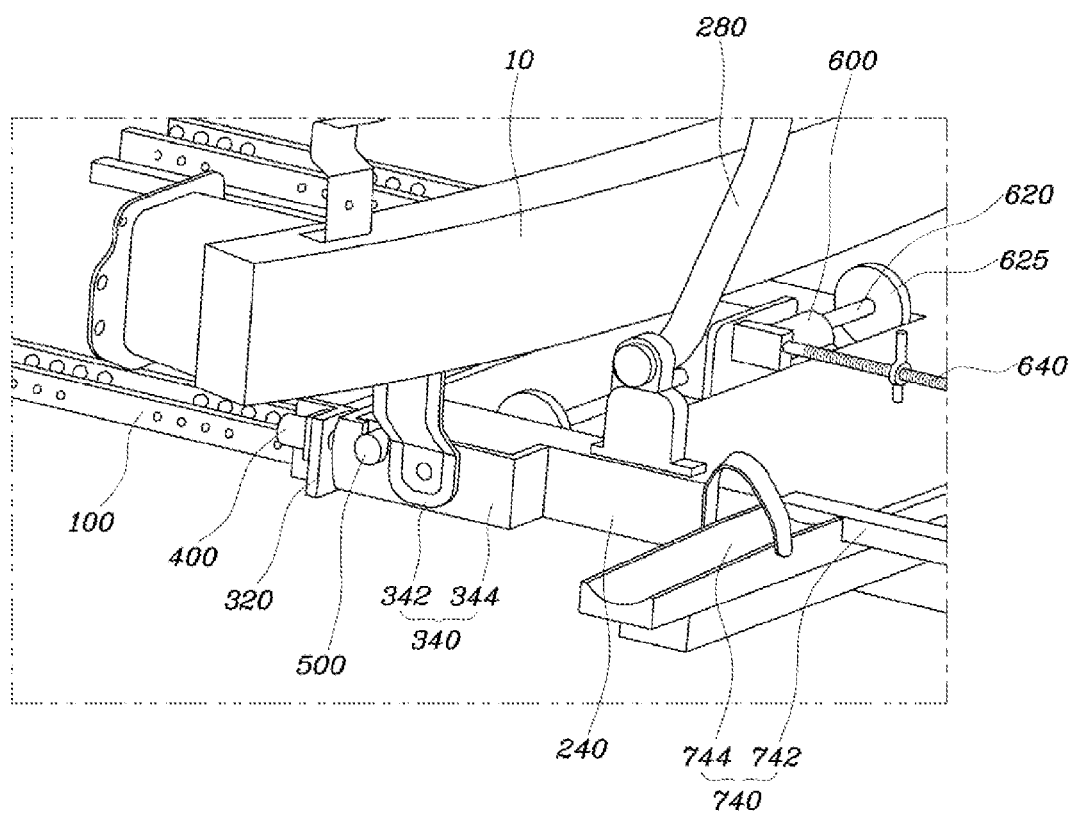
Figure 5:
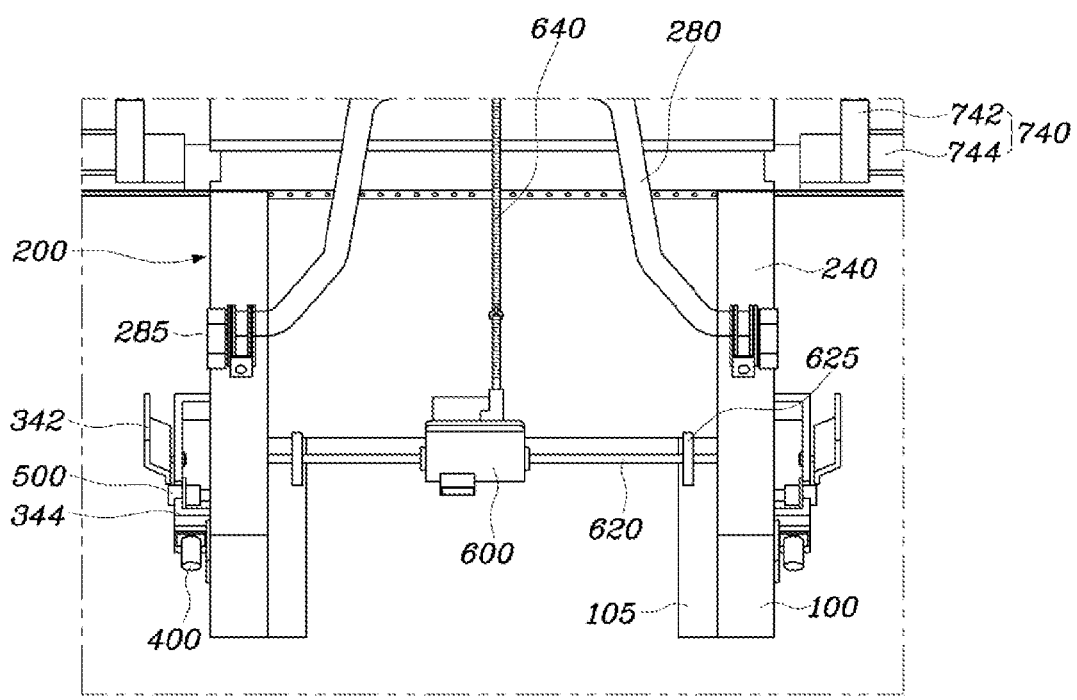
Figure 6:
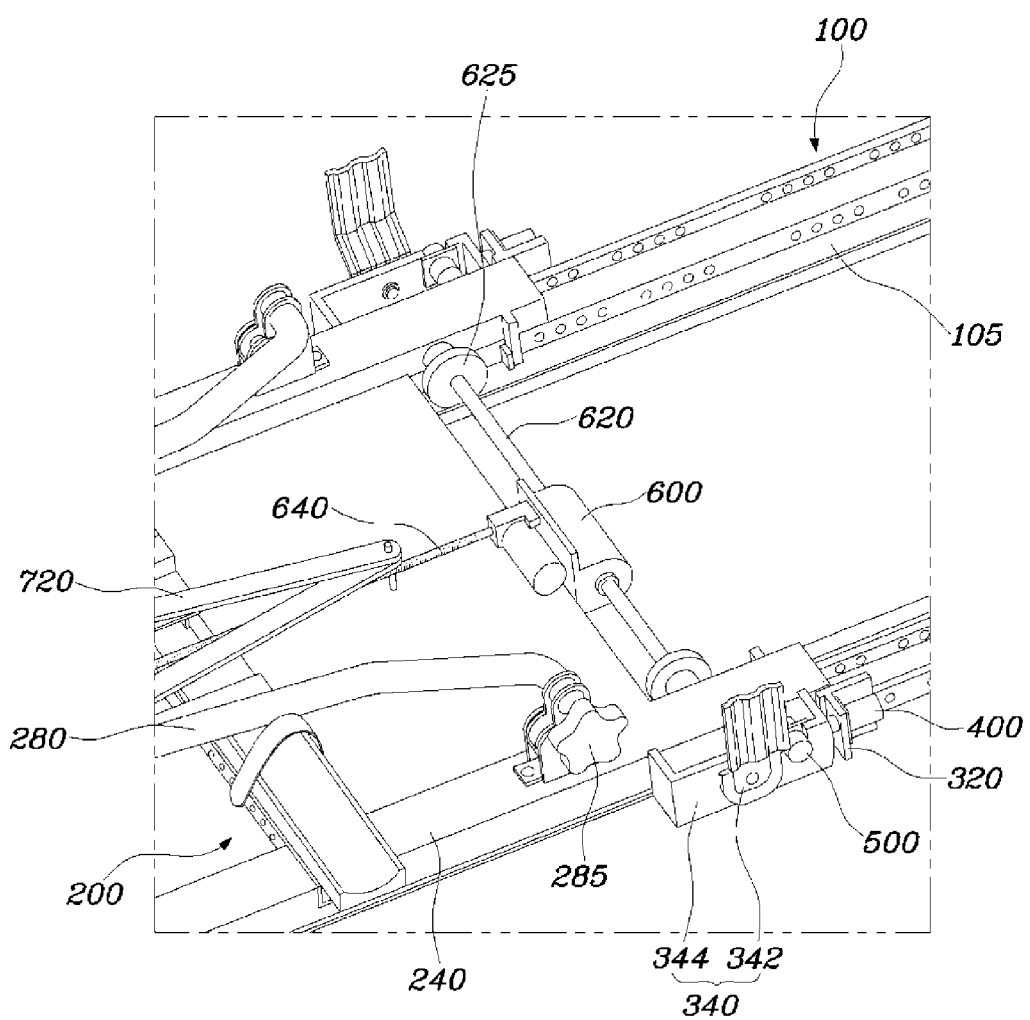
Figure 7:
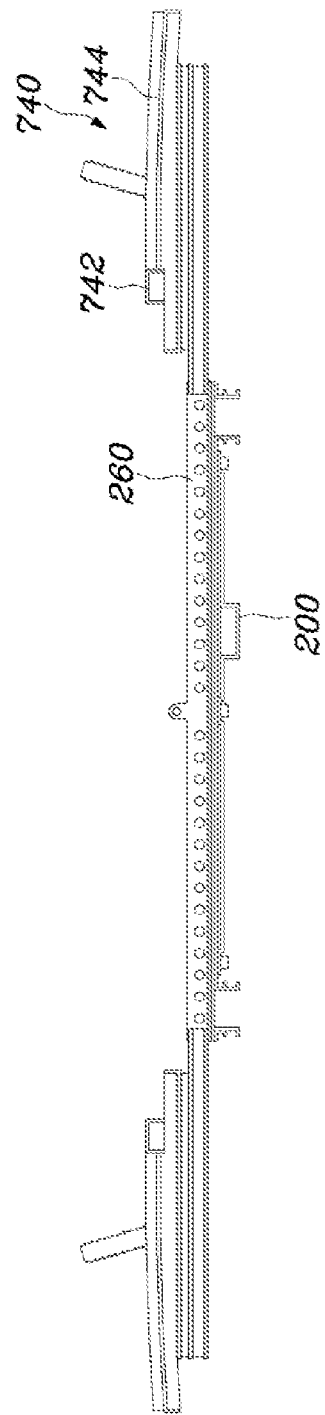
Figure 8:
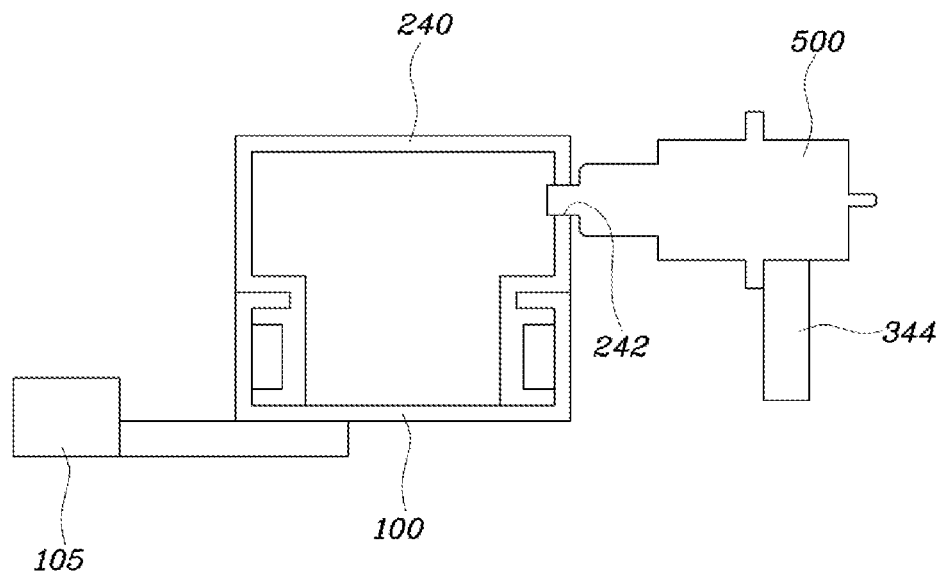

On the other hand, as shown in FIG. 4, a motor assembly 600 is disposed on the carrier 200 and has driving links 620 extending laterally toward the sliding rails 240, so that when the motor assembly 600 is operated, power is transmitted through the driving links 620 and accordingly, the carrier 200 can slide along the guide rails 100.

In detail, pinion gears 625 are disposed on the extending ends of the driving links 620 and rack gears 105 extending in the front-rear direction and engaged with the pinion gears 625 are disposed on the guide rails 100, so that as the driving links 620 are rotated by the motor assembly 600, the pinion gears 625 can move on the rack gears 105.

That is, the rack gears 105 are elongated in the front-rear direction on the guide rails 100 and the pinion gears 625 engaged with the rack gears 105 are disposed on the driving links 620 extending from the motor assembly 600 so that as the motor assembly 600 is operated, the driving links 620 are rotated and the pinion gears 625 are rotated with the rotation of the driving links 620, and accordingly the carrier 200 is moved along the rack gears 105.

Further, solenoids selectively allowing the carrier 200 to be drawn out by being selectively coupled to the sliding rails 240 of the carrier 200 may be further disposed on the guide rails 100 and they may be the second solenoids described above.

The solenoids may be operated in combination with the motor assembly 600 and are separated from the carrier 200 such that the carrier 200 can slide when the carrier 200 is drawn out, so that the carrier 200 can be stowed in or drawn out.

The motor assembly 600 has an expansion link 640 extending rearward from the motor assembly 600 to be perpendicular or substantially perpendicular to the driving links 620, and connected to the panel 220 and an expansion member 700 that opens to both sides from the extension link 640 when the motor assembly 600 is operated may be disposed on the expansion link 640.

That is, the expansion member 700 changes in width when it moves forward/rearward along the expansion link 640, thereby expanding.

In detail, the expansion member 700 is composed of or includes a pair of pivot bars 720 symmetrically or substantially symmetrically disposed with the expansion link 640 therebetween and having a first end connected to the expansion link 640 and a second end laterally extending, and a bicycle mount 740 supported on the sliding rails 240 of the carrier 200 may be disposed at the second ends of the pivot bars 720.

Figure 3:
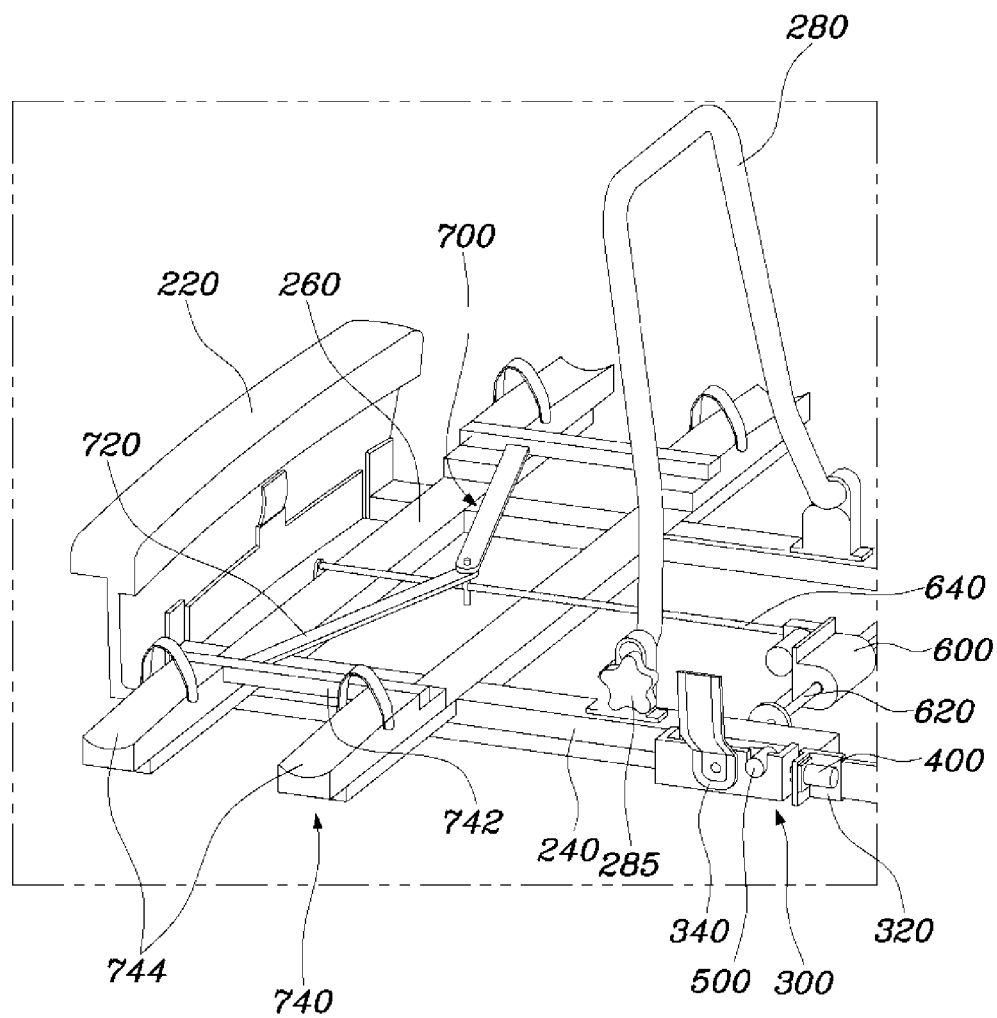
FIG. 3, FIG. 4, FIG. 5, FIG. 6, FIG. 7, FIG. 8, FIG. 9 and FIG. 10 are views illustrating the carrier apparatus for a vehicle shown in FIG. 1.

As shown in FIG. 3, the first ends of the pivot bars 720 of the expansion member 700 are connected to each other on the expansion link 640 and the second ends are laterally extended and connected to the bicycle mount 740 supported on the sliding rails 240 of the carrier 200.

The bicycle mount 740 is disposed on the sliding rails 240 of the carrier 200 to slide only to both sides, thus the second ends of the pivot bars 720 can move only to both sides, not in the front-rear direction, and the first ends of the pivot bars 720 are connected to the expansion link 640 and can move only in the front-rear direction. Accordingly, when the motor assembly 600 is operated and the power is transmitted to the expansion link 640, the first ends of the pivot bars 720 move forward or rearward and the second ends move inward or outward, so the bicycle mount 740 expands to both sides.

In detail, the bicycle mount 740 may be composed of or include movable members 742 hinged to the second ends of the pivot bars 720 and supporting members 744 disposed on the movable members 742 extending laterally and supporting the wheels of a bicycle.

The second ends of the pivot bars 720 are hinged to the movable members 742 of the bicycle mount 740, so that as the motor assembly 600 is operated and the pivot bars 720 laterally open, the movable members 742 laterally move and the supporting members 744 connected to the movable members 742 also laterally move, thereby expanding for mounting a bicycle.

The carrier 200 further includes a horizontal expansion rail 260 extending across the sliding rails 240 of both sides and the movable members 742 of the bicycle mount 740 are disposed on the horizontal expansion rail 260, so the movable members 742 can move laterally along the horizontal expansion rail 260.

Since the carrier 200 includes the horizontal expansion rail 260 extending to connect the sliding rails 240 of both sides, the bicycle mount 740 can smoothly expand to both sides by laterally opening along the horizontal expansion rail 260.

The tops of the support members 744, where the wheels of a bicycle are placed, may be curved, so the wheels of a bicycle can be firmly fixed to the supporting members 744 by specific fixing members 285.

The expansion link 640 may be a lead screw and the first ends of the pair of pivot bars 720 of the expansion member 700 may be connected to the expansion link 640, for example, through a lead nut.

Accordingly, since the expansion link 640 is a lead screw and the first ends of the pivot bars 720 of the expansion member 700 are connected to the expansion link 640 through a lead nut, as the motor assembly 600 is operated and the expansion link 640 is rotated, the lead nut where the first ends of the pivot bars 720 are connected can move forward/rearward along the expansion link 640.

As the motor assembly 600 is operated and the expansion link 640 that is a lead screw is rotated, as described above, the lead nut where the first ends of the pivot bars 720 are connected moves on the lead screw, so that the bicycle mount 740 connected to the second ends of the pivot bars 720 laterally opens.

A fixing bar 280 that can turn may be mounted on the sliding rails 240 of the carrier 200 and a lock 285 for fixing the position of the fixing bar 280 that has been turned may be provided.

The fixing bar 280 is a member for fixing a bicycle on the carrier 200 and a bicycle may be fixed to the fixing bar 280 by a specific clamping member. The fixing bar 280 is folded on the sliding rail 240, but in order to load a bicycle, it is turned upward and then fixed with the body of the bicycle on the carrier 200, so the loaded bicycle can be more firmly fixed.

The fixing bar 280 that has been turned can be fixed at the position by a specific solenoid or other various holding members, on the sliding rails 240 of the carrier 200. Various members such as a locking lever, a latch, or a solenoid may be used for the lock 285 for fixing the position of the fixing bars 280 that has been turned and a motor may be used so that the fixing bar 280 is automatically turned.

In the operation of the carrier apparatus for a vehicle of the present invention, the carrier is stowed in the rear bumper beam 10, not exposed to the outside, when the apparatus is not in use. In order to load a bicycle, a user activates the motor assembly 600 through a specific switch. The switch may be disposed on the tail gate or around the driver's seat. The motor assembly 600 rotates only the driving link 620.

When the motor assembly 600 operates, the driving link 620 rotates first and the pinion gears 625 rotate, and the rack gears 105 engaged with the pinion gears 625 move, so that the sliding rails 240 move rearward along the guide rails 100.

When the carrier 200 is fully drawn out from the rear bumper beam 10, the user stops the rotation of the driving link 620 by stopping the motor assembly 600 and checks whether to tilt the carrier 200.

When the user operates a specific switch to tilt the carrier 200, the tilting actuators 400 on the fixing brackets 320 of the tilting members 300 are operated and separated from the tilting brackets 340, so that tilting brackets 340 can turn. As the tilting brackets 340 rotate, the carrier 200 can tilt.

When the carrier 200 is fully drawn out from the rear bumper beam 10, the user rotates the expansion link 640 by activating the motor assembly 600 in order to load a bicycle. As the expansion link 640 is rotated, the first ends of the pivot bars 720 of the expansion member 700 move forward and the second ends laterally move with the forward movement of the first ends and laterally push the supporting members 744 of the bicycle mount 740, and accordingly, the bicycle mount 740 expands and a bicycle can be loaded.

According to the carrier apparatus for a vehicle which has the structure described above, the carrier is stowed in the rear bumper beam 10 of a vehicle, so it is not exposed to the outside when not in use, but automatically drawn out from the rear bumper beam 10 to load a bicycle, and therefore, the external appearance is maintained and convenience is also improved.

Further, in the process of deployment of the carrier apparatus, since the carrier 200 is drawn out first and then the bicycle mount 740 laterally expands, commercial value is also improved.

Further, since the carrier apparatus can tilt, after being drawn out, the rear loading-space can be more easily used.

For convenience in explanation and accurate definition in the appended claims, the terms "front" or "rear", "inward" or "outward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A carrier apparatus for a vehicle, comprising:
   guide rails substantially symmetrically disposed under a rear bumper beam and extending in a front-rear direction of the vehicle;
   a carrier that has a panel and sliding rails extending from both sides of the panel to the corresponding guide rails and is stowed or drawn out under the rear bumper beam by sliding in the front-rear direction along the guide rails;
   tilting mechanisms including:
      fixing brackets fixed at rear ends of the guide rails; and
      tilting brackets disposed behind the fixing brackets at the rear ends of the guide rails and engaged to the sliding rails and pivotally coupled to the rear bumper beam, wherein the tilting brackets are selectively rotatable about the rear bumper beam; and
   tilting actuators mounted on the fixing brackets of the tilting mechanisms to be selectively connected to the tilting brackets,
   wherein the tilting actuators is engaged to the tilting brackets to restrict turning of the tilting brackets when not in use, and are disengaged from the tilting brackets to allow the carrier to turn with the tilting brackets when the carrier is fully drawn out.

2. The carrier apparatus for a vehicle of claim 1, wherein the fixing brackets of the tilting mechanisms are fixed to the rear ends of the guide rails, and
   each tilting bracket includes a fixing member that is fixed to the rear bumper beam and extends downward and a tilting member that is disposed behind a corresponding fixing bracket and selectively rotatable on the fixing member.

3. The carrier apparatus for a vehicle of claim 2, wherein a tilting stopping groove is formed at an end, adjacent the corresponding fixing bracket, of the tilting member of the tilting bracket, and
   a tilting actuator selectively inserted into the tilting stopping groove of the tilting member is disposed on the corresponding fixing bracket.

4. The carrier apparatus for a vehicle of claim 3, wherein the tilting actuators include first solenoids.

5. The carrier apparatus for a vehicle of claim 2, wherein the tilting member of the tilting bracket has a slider and the sliders allow or prevent sliding of the carrier by being selectively coupled to the sliding rails of the carrier.

6. The carrier apparatus for a vehicle of claim 5, wherein the sliders include second solenoids, and slider stopping grooves to which the second solenoids are selectively coupled are formed on sides of the sliding rails.

7. The carrier apparatus for a vehicle of claim 1, wherein a motor assembly is disposed on the carrier and has driving links extending laterally toward the sliding rails, and when the motor assembly is operated, power is transmitted through the driving links so that the carrier slides along the guide rails.

8. The carrier apparatus for a vehicle of claim 7, wherein pinion gears are disposed on extending ends of the driving links and rack gears extending in the front-rear direction and engaged with the pinion gears are disposed on the guide rails, so that as the driving links are rotated by the motor assembly, the pinion gears move on the rack gears.

9. The carrier apparatus for a vehicle of claim 7, wherein the motor assembly has an expansion link extending rearward from the motor assembly to be substantially perpendicular to the driving links, and connected to the panel, and
   an expansion member opening to both sides from the extension link when the motor assembly is operated is disposed on the expansion link.

10. The carrier apparatus for a vehicle of claim 9, wherein the expansion member includes a pair of pivot bars substantially symmetrically disposed with the expansion link therebetween, the pair of the pivot bars having first ends connected to the expansion link and second ends laterally extending, and
   a bicycle mount supported on the sliding rails of the carrier is disposed at the second ends of the pivot bars.

11. The carrier apparatus for a vehicle of claim 10, wherein the bicycle mount includes movable members hinged to the second ends of the pivot bars and supporting members disposed on the movable members, extending laterally, and supporting the wheels of a bicycle.

12. The carrier apparatus for a vehicle of claim 10, wherein the carrier includes a horizontal expansion rail extending across the sliding rails and the movable members of the bicycle mount are disposed on the horizontal expansion rail, so the movable members move in both side directions along the horizontal expansion rail.

13. The carrier apparatus for a vehicle of claim 10, wherein the expansion link includes a lead screw and the first ends of the pair of the pivot bars of the expansion member are connected to the expansion link through a lead nut.

14. The carrier apparatus for a vehicle of claim 1, wherein a fixing bar that is able to turn and a lock for fixing a position of the fixing bar that has been turned are mounted on the sliding rails of the carrier.

* * * * *